(12) United States Patent
Kramer et al.

(10) Patent No.: US 12,337,557 B2
(45) Date of Patent: Jun. 24, 2025

(54) DEVICE AND METHOD FOR TREATING THE SURFACE OF MOLDED PARTS

(71) Applicant: DyeMansion GmbH, Planegg (DE)

(72) Inventors: Philipp Kramer, Munich (DE); Felix Ewald, Munich (DE); Tibor Naether, Munich (DE)

(73) Assignee: DyeMansion GmbH, Planegg (DE)

( * ) Notice: Subject to any disclaimer, the term of this patent is extended or adjusted under 35 U.S.C. 154(b) by 0 days.

(21) Appl. No.: 18/593,252

(22) Filed: Mar. 1, 2024

(65) Prior Publication Data
US 2024/0198610 A1 Jun. 20, 2024

Related U.S. Application Data

(63) Continuation of application No. 17/193,556, filed on Mar. 5, 2021, now Pat. No. 12,023,880, which is a
(Continued)

(30) Foreign Application Priority Data

Sep. 7, 2018 (DE) .................... 10 2018 121 915.6

(51) Int. Cl.
*B29C 71/00* (2006.01)
*B29C 64/35* (2017.01)
*B33Y 40/20* (2020.01)

(52) U.S. Cl.
CPC .......... *B29C 71/0009* (2013.01); *B29C 64/35* (2017.08); *B29K 2995/0073* (2013.01); *B33Y 40/20* (2020.01)

(58) Field of Classification Search
CPC ................................................. B29C 71/0009
See application file for complete search history.

(56) References Cited

U.S. PATENT DOCUMENTS 8,014,889 B2 * 9/2011 Zinniel .................. G06Q 50/04
700/98
8,765,045 B2 7/2014 Zinniel
(Continued)

FOREIGN PATENT DOCUMENTS

EP       1 038 992 A1    9/2000
WO   2018/127683 A1    7/2018

OTHER PUBLICATIONS

International Search Report for corresponding International Patent Application No. PCT/EP2019/073984 mailed on Nov. 27, 2019.
(Continued)

*Primary Examiner* — Timothy Kennedy
(74) *Attorney, Agent, or Firm* — Myers Wolin, LLC

(57) ABSTRACT

A method is provided for treating a surface of a molded part produced in a 3D printing method. In the method, the molded part is introduced into a pressure-tight container, negative pressure, preferably a vacuum to a large extent, is generated in the container after introducing the molded part, a solvent is heated up to a specified solvent temperature, and the heated solvent is introduced from a solvent container into the container under negative pressure. In such a method, the temperature of the molded part is lower than the solvent temperature, and the solvent is evaporated or is introduced as a vapor upon being introduced, the solvent vapor condensing on the surface of the molded part. Also provided is a device for carrying out the method.

24 Claims, 8 Drawing Sheets

Related U.S. Application Data continuation of application No. PCT/EP2019/073984, filed on Sep. 9, 2019.

(56) References Cited

U.S. PATENT DOCUMENTS

2009/0321972 A1  12/2009  Zinniel
2021/0170702 A1* 6/2021  Abstreiter .............. B33Y 10/00

OTHER PUBLICATIONS

Non-Final Office Action issued for U.S. Appl. No. 17/193,556, electronically mailed on Jun. 1, 2023.

* cited by examiner

DEVICE AND METHOD FOR TREATING THE SURFACE OF MOLDED PARTS

CROSS REFERENCE TO RELATED APPLICATIONS

This application is a continuation of U.S. patent application Ser. No. 17/193,556, filed Mar. 5, 2021, which is a continuation of International Application No. PCT/EP2019/073984, filed on Sep. 9, 2019, which takes priority from German Patent Application No. 10 2018 121 915.6, filed Sep. 7, 2018, the contents of each of which are incorporated by reference herein.

TECHNICAL FIELD

The invention relates to a method for treating the surface of at least one molded part produced in a 3D printing method, a device for treating the surface of at least one molded part produced in a 3D printing method, and also to a molded part produced by a method according to the invention or to a molded part whose surface has been treated using the method according to the invention.

BACKGROUND

It is known to produce molded parts in a 3D printing method. 3D printing methods are additive manufacturing processes in which a molded part is constructed in layers, in particular using a plastics material.

Such additive manufacturing processes have the disadvantage that the molded parts produced with them generally do not have a closed surface, i.e. have a production-related rough surface, which in many cases can negatively affect the haptic impression for the user of the molded part. In addition, a rough surface of such a molded part tends to become soiled relatively quickly, and cleaning the surface is only possible with considerable effort. In addition, the surface of such molded parts has a large number of pores due to the manufacturing process.

In order to smooth the surfaces of the molded parts produced in a 3D printing method, the surfaces can be mechanically processed, for example abraded and/or blasted. The disadvantage in this case, however, is that there is an—albeit small—material removal from the surface of the molded part, which is usually above specified tolerance values to achieve the desired surface smoothness, so that the smoothing of the surface is accompanied by an undesirable change in the geometry of the molded part. In addition, when grinding, it is not possible to reach into small corners or small recesses that then remain unprocessed and are therefore not smoothed. In the case of flexible molded parts, such mechanical methods for smoothing the surface cannot be used or can only be used with great difficulty. In addition, regions of the surface that are extremely concave or have undercuts can only be mechanically smoothed with great effort or not at all. In the case of very filigree surface structures, there is also the risk that they will be damaged during grinding or blasting. Furthermore, pores present on the surface are only insufficiently closed even during grinding or blasting.

Another disadvantage of mechanical surface smoothing is that it is not suitable for series production.

An object of the present invention is therefore to provide solutions which allow surfaces of molded parts produced in a 3D printing method to be efficiently smoothed or homogenized without significant changes in the geometry of the molded parts and also in the case of flexible molded parts and can be used efficiently with molded parts that have surface portions that are difficult to machine mechanically.

SUMMARY

This object is achieved by a method for treating the surface of at least one molded part produced in a 3D printing method and a device for treating the surface of at least one molded part produced in a 3D printing method according to the independent claims. Advantageous refinements and developments of the invention result from the respective dependent claims. 3D printing methods are purely additive manufacturing processes.

Accordingly, a method is provided for treating the surface of at least one molded part produced in a 3D printing method, wherein:

(a) the molded part is introduced into an interior of a pressure-tight container,
(b) a negative pressure, preferably a vacuum to a large extent, is generated in the interior of the container after introducing the molded part into the container,
(c) a solvent is heated up to a specified solvent temperature, and
(d) the heated solvent is introduced from a solvent container into the interior under
  negative pressure after introducing the molded part into the interior of the container, wherein
  the temperature of the molded part is lower than the solvent temperature, and
  the solvent is evaporated into the interior or is introduced as a vapor into the interior upon being introduced, said solvent vapor condensing on the surface of the molded part.

It is advantageous if a negative pressure is generated in the interior of the container after introducing the molded part into the container which is less than 10 mbar.

Due to the negative pressure or the vacuum to a large extent in the interior of the container, it is ensured that the solvent enters the interior in vaporous form and, due to the lower temperature of the molded part, condenses on the surface thereof. With the help of the temperature difference between the molded part and the solvent vapor and the duration of the solvent supply and possibly the pressure difference between the solvent container and the interior of the pressure-tight container, the solvent condensate that forms on the surface of the molded part can be controlled very precisely, which in turn allows the degree of dissolution of the surface to be controlled. This cannot be achieved with a solvent bath in which the molded part to be treated is placed.

It can be advantageous if the interior of the pressure-tight container is brought to a specified first internal temperature before step (a) or after step (a). For this purpose, a temperature sensor can be arranged in the interior of the pressure-tight container.

By introducing the solvent into the interior space (step (d)), the temperature of the interior space can be brought to a specified second internal temperature, which can be lower or higher than the specified first internal temperature, wherein
  as long as the solvent is introduced into the interior space until a specified second internal temperature is reached, or
  the solvent is introduced into the interior over a specified period of time, the specified second internal temperature being reached after the specified period of time.

The first internal temperature and the second internal temperature can be the same.

The second internal temperature can therefore be higher, just as high, or lower than the first internal temperature. A lowering of the temperature can be caused by the natural cooling of the chamber or the evaporative cooling, and it can be allowed actively by a cooling unit.

In one embodiment of the invention, it can be advantageous if the solvent is introduced into the interior over a period of between 1 s and 600 s, preferably between 5 s and 300 s (step (d)).

It can be advantageous if, after introducing the molded part into the interior (step (a)) and before introducing the solvent into the interior (step (d)) the temperature of the interior is brought to a third internal temperature.

The third internal temperature can be lower than the specified second internal temperature, whereby the molded part is brought to a part temperature which is lower than the specified second internal temperature. In one embodiment of the method, the part temperature can be the same as the third internal temperature.

In one embodiment of the invention,
(e) after introducing the solvent into the interior, the molded part can be dried.

It is advantageous if the molded part is dried, in particular vacuum-dried, in the interior having the negative pressure.

It can be advantageous if the molded part is dried in the interior, wherein a negative pressure, preferably a vacuum to a large extent, is generated to dry the molded part in the interior, wherein the generation of the negative pressure is interrupted at least once in that a transport gas is supplied into the interior. After supplying the transport gas, the generation of the negative pressure can be continued. This procedure can be repeated multiple times.

It can be advantageous in this case if the transport gas is supplied to the interior when the pressure in the interior is less than 50 mbar, the pressure in the interior being increased to a value of between 50 mbar and 100 mbar by supplying the transport gas. After a pressure between 50 mbar and 100 mbar has been reached, the generation of the negative pressure can be continued until the internal pressure is again less than 50 mbar. This procedure can be repeated multiple times.

According to an advantageous embodiment of the method, steps (d) and (e) can be repeated multiple times.

It can be advantageous in this case if during a repetition
in step (d) the temperature of the interior is brought to a second internal temperature which is higher than the second internal temperature in the previous execution of step (d), or
in step (d) the temperature of the interior is brought to a second internal temperature which is lower than the second internal temperature in the previous execution of step (d), or
in step (d) the temperature of the interior is brought to a second internal temperature which is equal to the second internal temperature in the previous execution of step (d).

During a repetition, before step (d) is carried out, the temperature of the interior can be brought to a temperature which is lower or higher than the second internal temperature in the previous execution of step (d).

It can be advantageous if the temperature of the solvent is reduced after each repetition.

After step (d), the solvent evaporated in the interior space and/or the solvent condensed on the inner wall of the interior space can be suctioned off.

The suctioned off solvent can be processed, in particular cleaned and distilled, and the processed solvent is returned to the solvent container. In a particularly advantageous embodiment of the invention, this results in a method in which a solvent is used which can be used as often as desired in the cycle without impairing the quality of the smoothing result, without solvent waste or other products requiring disposal.

According to the invention, the negative pressure in the interior, the solvent temperature, and the internal temperatures can be coordinated so that the solvent evaporates in the interior upon being introduced into the interior or enters the interior as solvent vapor.

The pressure difference between the solvent container and the interior of the pressure-tight container can result in turbulence in the interior, which allows the solvent to be homogeneously distributed around the component, in particular in the region of undercuts, cavities, tubes, and blind holes. This ensures a homogeneous smoothing even on difficult to access surface regions.

It has been found to be advantageous if the introduced molded part is moved, in particular rotated, in steps (d) and/or (e). This prevents the formation of drops or noses on the surface of the molded part.

Optionally, the surface of the molded part can be mechanically processed, in particular ground or blasted, before introducing into the interior.

It is optional, but nevertheless advantageous, if
the molded part is colored before step (a) or after step (d), and/or
the molded part is freed from residual powder before step (a), provided that the molded part was printed in a powder-based method, and/or
the molded part is matted after step (d), in particular by means of blasting the surface, and/or is ground, and/or
the molded part is impregnated and/or painted after step (d), and/or
the surface of the molded part is compacted before step (a) or after step (d), in particular by means of blasting the surface with plastics material balls, and/or
the surface of the molded part is smoothed before step (a) or after step (d), in particular by means of grinding.

The molded part can be heated before step (a). This is particularly advantageous for materials that tend to absorb water, as they otherwise tend to form additional bubbles during the smoothing process due to the evaporation of the bound water (at high temperatures and/or under negative pressure).

The solvent (both classic solvents and high boilers) can be selected from the group comprising acetaldehyde, acetamide, acetone, acetonitrile, acetophenone, acetylene, aliphatic hydrocarbons, in particular cyclohexane, cyclohexene, diisobutylene, hexane, octane, n-pentane and terpinene, alcohols, in particular benzyl alcohol, butylene glycol, butanol, ethanol, ethylene glycol, methanol, ethanol, ethylene glycol, methanol, allyl alcohol, n-propanol and isopropanol, amyl acetate, aniline, anisole, benzine, benzaldehyde, benzene, chlorobenzene, decalin, dioxane, dimethylamide, diemethylformaid, diethyl ether, dimethylformamide, dimethyl sulfide, dimethyl sulfoxide, ethylbenzene, ethyl acetate, formaldehyde, formamide, furfural, halogenated hydrocarbons, in particular chlorobromomethane, chloroform, ethylene chloride, methylene chloride, perchlorethylene, tetrachloromethane, trichloroethane and trichlorethylene, menthone, methyl tert-butyl ether, methylethylene ketone, nitrobenzene, phenols, phenylethyl alcohol, propanol, pyridine, styrene, tetrahydrofuran, tetrahydronaphthalene, tetrahydronaphthalene, and combinations thereof.

It is particularly advantageous if the solvent is a distillable solvent.

For the production (printing) of the molded part, the material of the molded part can be selected from the group comprising polyester, PA12 (polyamide 12), PP (polypropylene), TPU (thermoplastic polyurethane), TPE (thermoplastic elastomers), PA11 (polyamide 11), PA6 (polyamide 6), PA6.6 (polyamide 6.6), glass-filled polyamide, ceramic-filled polyamide, PU (polyurethane), ABS (acrylonitrile-butadiene-styrene copolymers), PEK (polyether ketone), PEI (polyetherimide), PPS (polyphenylene sulfide), and PLA (polylactide), cyanate ester, materials based on (meth) acrylates, and combinations thereof.

It is advantageous if the molded part is produced in a powder-based 3D printing method, in particular in a powder-based layer construction, in which individual layers are fused together, in particular in the SLS (selective laser sintering) method, MJF (MultiJet fusion) method, or HSS (high-speed sintering) method.

It is advantageous if a plurality of liters of solvent, preferably at least 20 liters of solvent, are heated to the specified solvent temperature.

It can be advantageous if the solvent is heated to the specified solvent temperature which is above 100° C.

The solvent container can be designed to be pressure-tight, wherein a negative pressure is produced in the interior of the solvent container before introducing the solvent from the solvent container into the interior of the pressure-tight container.

It can be advantageous in this case if a vacuum is generated to a large extent in the interior of the solvent container.

It is particularly advantageous if the pressure in the interior of the pressure-tight container is lower than the pressure in the interior of the solvent container.

In one embodiment of the invention, it can be advantageous if the pressure difference between the interior of the pressure-tight container and the interior of the solvent container is selected so that the solvent introduced into the interior of the pressure-tight container is swirled due to the pressure difference.

It has proven to be advantageous if a food-safe solvent or a solvent approved for processing plastics material for food is used as a solvent.

Furthermore, a device is provided for treating a surface, in particular according to the method according to the invention, of at least one molded part produced in a 3D printing method, the device having a pressure-tight container having an interior in which the molded parts to be treated are received,
a solvent container for holding a solvent, and
a vacuum pump,
wherein
the solvent container is coupled to the pressure-tight container via a supply line in order to supply the solvent from the solvent container to the pressure-tight container, and
the vacuum pump is coupled to the pressure-tight container in order to generate a negative pressure, preferably a vacuum to a large extent, in the pressure-tight container.

It can be advantageous if the solvent container has a heating device in order to heat the solvent received in the solvent container.

Furthermore, it can be advantageous if the pressure-tight container has a heating device in order to heat the interior and/or the molded parts received in the interior.

In one embodiment of the invention, the solvent container can be designed to be pressure-tight.

In one embodiment of the invention, a vacuum pump is coupled to the solvent container in order to generate a negative pressure, preferably a vacuum to a large extent, in the solvent container.

It can be advantageous if a temperature sensor and/or a pressure sensor is assigned to the solvent container and/or the pressure-tight container.

The device can have a control/regulating device with which
the heating device of the pressure-tight container and the vacuum pump can be regulated and/or controlled in order to set the pressure and the temperature in the interior of the pressure-tight container, and
the heating device of the solvent container can be regulated and/or controlled in order to set the temperature of the solvent.

The pressure-tight container can be coupled to a suction device in order to suction out solvent vapor and/or solvent condensate present in the pressure-tight container.

The suction device can be coupled to the solvent container via a return line in order to return the suctioned off solvent vapor and/or the suctioned off solvent condensate to the solvent container.

The device can have a cleaning and/or distilling device which is adapted to clean and/or distill the suctioned off solvent vapor and/or the suctioned off solvent condensate.

According to one embodiment of the invention, the device can have at least one further solvent container which is coupled to the pressure-tight container via at least one further supply line to supply at least one further solvent from the at least one further solvent container to the pressure-tight container. Different solvents can thus be used for the treatment of the surface, for example a first solvent in a first treatment cycle and a second solvent in a second treatment cycle.

The solvent container can be pressure-tight.

A molded part made of plastics material is also provided, which has been produced in a 3D printing method and the surface of which has been treated by the method according to the invention.

BRIEF DESCRIPTION OF THE DRAWINGS

Further details and features of the invention will become apparent from the following description taken in conjunction with the drawing, in which.

DETAILED DESCRIPTION

Figure 1A:
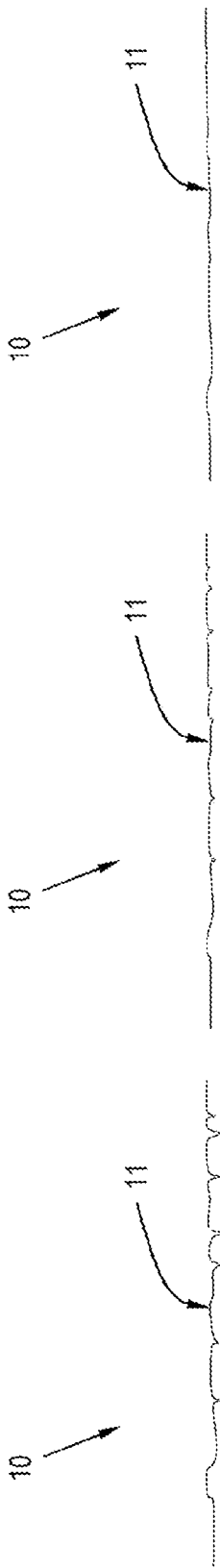
FIGS. 1A-C are enlarged illustrations of a section of a surface of a molded part produced in a 3D printing method, which surface is smoothed according to the method according to the invention.
Figure 1B:
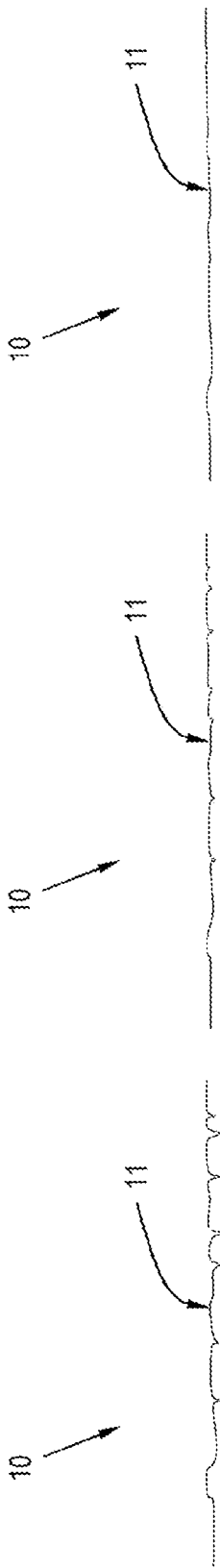
Figure 1C:
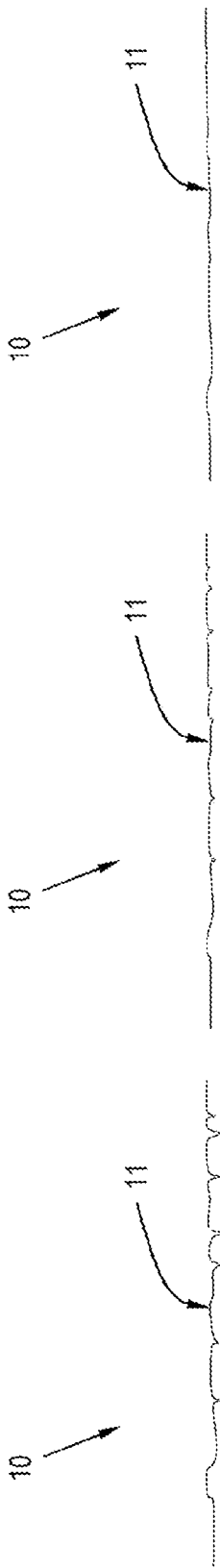

FIGS. 1A-C show an enlarged section of a surface 11 of a molded part 10 produced in a 3D printing method in FIG. 1A. A powder-based printing method was used in this case to produce the molded part 10. The surface 11 of the molded part 10 has manufacturing-related unevenness, in particular pores, which promote the adhesion of dirt or impurities to the surface 11 of the molded part 10. The rough or porous surface 11 of the molded part 10 also has a negative effect on the feel of the molded part 10. The surface shown in FIG. 1A has not yet been processed with the method according to the invention.

According to the invention, the surface 11 of the molded part 10 is smoothed in order to eliminate or close the unevenness, in particular the pores. For this purpose, a solvent in the form of solvent vapor is applied to the surface 11 of the molded part 10 and condenses on the surface of the molded part. The molded part is then dried. The method according to the invention for treating the surface is described in detail with reference to FIGS. 2 to 6.

The treatment of the surface 11 can comprise a plurality of cycles, with solvent, i.e. solvent vapor, being applied to the surface in each cycle and the molded part 10 being subsequently dried. Depending on the material used, which was used to manufacture the molded part in the 3D printing method, and depending on the requirement for the smoothness of the surface to be achieved, a single cycle may be sufficient. However, multiple cycles are beneficial.

FIG. 1B shows the surface 11 of the molded part 10 after a first treatment cycle in which solvent was applied to the surface 11 in the form of solvent vapor and was then dried. It can be clearly seen in this case that the surface 11 is significantly smoother than the surface shown in FIG. 1A; in particular, it has almost no pores.

In order to bring about an even further smoothing of the surface, a further processing cycle can be carried out in which again solvent in the form of solvent vapor is applied to the surface 11 of the molded part 10 and the molded part 10 is then dried.

The illustration in FIG. 1C shows the surface 11 of the molded part 10 after the second treatment cycle. It can be seen here that the surface 11 has been smoothed even further compared to the surface shown in FIG. 1B. It can also be seen that the smoothing method led to almost no change in the geometry of the molded part. In contrast to the mechanical surface treatment, there is almost no material removal in this case, since the surface of the molded parts is only slightly dissolved with the solvent applied to the surface 11, whereby unevenness is eliminated. A significant advantage, however, is that pores present on the surface are closed.

The molded parts treated in this way have a particularly high level of surface smoothness, so that in many cases there is no need to impregnate the surface.

Figure 2:
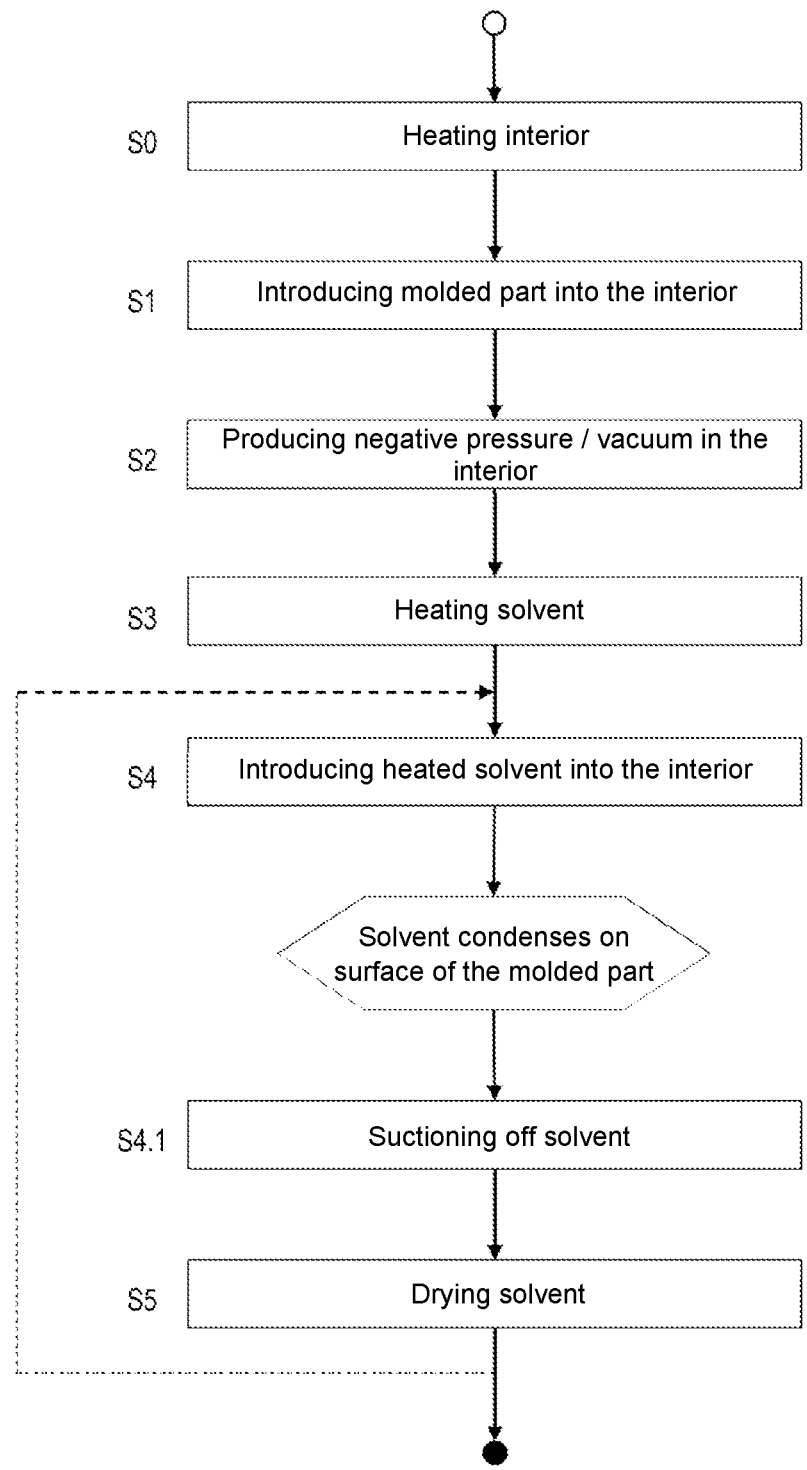
FIG. 2 is a flow chart to illustrate the method according to the invention.

FIG. 2 shows a flow chart according to an embodiment of the method according to the invention.

To carry out the method, a device is provided which has a pressure-tight container having an interior in which the surface of the molded part is treated, and a container which contains a solvent. These two containers are connected to one another via a line, the supply of solvent into the container in which the molded part is being treated being controlled via a valve. The container in which the molded part is treated is designed to be pressure-tight. The container that contains the solvent is preferably also designed to be pressure-tight.

The molded part produced in a 3D printing method is introduced into the interior of the pressure-tight container in step S1.

Before introducing the molded part into the pressure-tight container, the molded part can be heated to a specific temperature, for example to between 90 and 120° C. How far the molded part can be heated depends substantially on the material or plastics material used with which the molded part is produced in the 3D printing method. As a result, depending on the material used, the molded part can be heated to over 120° C. or even to a temperature below 90° C. The maximum temperature to which the molded part can be heated must always be set so that the molded part does not deform due to the temperature. In addition, the maximum temperature to which the molded part is heated must be set so that the temperature of the molded part can rise further in the subsequent processing process due to the solvent vapor flowing into the interior of the pressure-tight container without resulting in deformation of the molded part.

As an alternative to heating the molded part before introducing it into the pressure-tight container, the molded part can also be heated after introducing it into the pressure-tight container, i.e. heated in the pressure-tight container.

For this purpose, in a step S0, which is carried out before step S1, the interior of the pressure-tight container can be heated to a specified temperature, for example 130° C. The interior of the pressure-tight container can be heated with a heating device, for example by means of heating jackets. The heating can be controlled by means of a temperature sensor which is arranged in the interior of the pressure-tight container.

After the interior has reached the specified temperature, the molded part can be introduced into the interior of the pressure-tight container (step S1). The molded part introduced is heated to a specific temperature, the internal temperature of the interior cooling down somewhat at the same time, since the molded part absorbs a specific amount of heat energy when it is heated or the pressure-tight container releases heat to the environment. For example, the interior of the pressure-tight container can cool down to approximately 108° C. and the molded part heats up to approximately 108° C., preferably to a maximum of 108° C.

With the aid of the heating device, it can be ensured, if necessary, that the internal temperature does not drop below a specific temperature or does not drop at all after the molded part has been introduced into the interior. If the interior is heated to 130° C., for example, it can be ensured that the temperature of the interior remains at approximately 130° C. or does not drop below, for example, 108° C. after introducing the molded part.

Alternatively, step S0 can also be carried out after step S1. This means that after the molded part has been introduced into the interior of the pressure-tight container, the interior of the pressure-tight container is heated, for example to about 108° C. This also heats the molded part to about 108° C.

After introducing the molded part, a negative pressure, preferably a vacuum to a large extent, is generated in the interior of the pressure-tight container. In this context, negative pressure means a pressure below atmospheric pressure. In connection with the present invention, "vacuum" is understood to mean a pressure below 300 mbar.

It is advantageous if the negative pressure or vacuum is generated in the interior of the pressure-tight container immediately after introducing the molded part into the interior in order to prevent the molded parts from yellowing or otherwise being discolored during heating. It has been shown that the molded parts can be prevented from yellowing when the molded parts are heated if they are not exposed to any or virtually no oxygen. Accordingly, it is advantageous to generate a negative pressure or a vacuum in the pressure-tight container immediately after introducing the molded part into the pressure-tight container, regardless of whether step S0 is carried out before step S1 or after step S1.

In a step S3, the solvent stored in the solvent container is heated to a specified solvent temperature, for example to 130° C. The solvent container is preferably designed to be pressure-tight.

It has been found to be particularly advantageous if the amount of heated solvent is a plurality of liters, preferably at least 20 liters. This ensures that sufficient solvent is available at a suitable temperature for the process. This allows for a particularly stable and thus reproducible process, which can also be carried out independently of the quantity of parts to be processed or their surface, without this having any influence on the smoothing result.

The solvent in the solvent container can be heated, for example, by means of a sleeve or jacket heater or directly via heating elements in each case.

For many applications, a solvent temperature of over 100° C. has proven to be particularly advantageous, as this ensures that there is a sufficient temperature difference between the parts to be smoothed and the solvent vapor throughout the entire process. This ensures the condensation of the solvent on the surface. At the same time, an increased temperature of the solvent is crucial for the temperature of the solvent condensate, which in turn has a decisive influence on the solubility of the solvent and thus the smoothing result.

Step S3 can be carried out before steps S0 to S2 or in parallel with steps S0 to S2, it only being necessary to ensure that the solvent has reached the specified solvent temperature before carrying out step S4. This can be checked with the aid of a temperature sensor in the, preferably pressure-tight, solvent container.

After the solvent has reached the specified solvent temperature, and the interior of the pressure-tight container or the molded part introduced into the interior has reached the desired temperature, the heated solvent is introduced into the interior of the pressure-tight container under negative pressure in step S4. This can be done, for example, by opening a valve which separates the interior of the pressure-tight container from the interior of the solvent container.

By opening this valve and due to the pressure difference between the interior of the pressure-tight container and the solvent container, a specific amount of solvent enters the gas-free and heated interior of the pressure-tight container and evaporates there suddenly. Alternatively, solvent vapor can already get into the gas-free and heated interior of the pressure-tight container.

Whether solvent vapor gets into the interior or whether solvent gets into the interior and suddenly evaporates there ultimately depends on the temperature and pressure conditions in the interior and in the solvent container. However, it is advantageous if the solvent already reaches the interior as solvent vapor. It is particularly advantageous in this case if the solvent container also has a negative pressure, particularly preferably a vacuum to a large extent. This allows higher-boiling solvents to evaporate at temperatures which are low enough not to destroy the molded part, for example a molded part made of a polymer with a comparatively low melting point. For benzyl alcohol as the solvent, for example, a pressure in the solvent container of 100 mbar to 150 mbar at a solvent temperature of about 140° C. has proven to be advantageous. In this way, even for high-boiling solvents, a vapor temperature can be achieved which is suitable for processing the molded parts without the molded parts being destroyed by the thermal load or dissolving or completely dissolving. The negative pressure in the solvent container also has the advantage of a very safe process, since the negative pressure generated prevents solvent from escaping and, in the event of a leak, only air would be drawn in. The pressure in the solvent container can be monitored with the aid of a pressure sensor.

The temperature of the interior of the pressure-tight container and the negative pressure generated in the interior and the solvent temperature are to be coordinated so that the solvent introduced into the interior can suddenly evaporate unless solvent vapor is already supplied to the interior of the pressure-tight container. Pressures in the interior of the pressure-tight container of less than 10 mbar have proven to be particularly advantageous.

In the event that the solvent is already evaporated in a pressure-tight solvent container, and in particular in the event that this can only be achieved by generating a negative pressure in the solvent container (if for example benzyl alcohol is to evaporate at a maximum solvent temperature of 140° C.), the particularly low pressure of less than 10 mbar in the interior of the pressure-tight container still has the technical advantage that there is a sufficiently large pressure gradient (between the interior of the pressure-tight container and the interior of the pressure-tight solvent container), to efficiently supply the evaporated solvent to the pressure-tight interior.

For solvents with a low evaporation temperature, the interior temperature of the pressure-tight container can be selected to be lower and/or lower negative pressures can be generated in the interior of the pressure-tight container. However, it has been proven that very high negative pressures, such as an almost perfect vacuum, favor the evaporation of the solvent introduced, in particular since a vacuum should be generated anyway to a large extent in order to prevent the molded parts from yellowing when heating the molded parts.

Due to the temperature difference between the molded parts introduced into the interior of the pressure-tight container and the solvent vapor introduced into this interior (the molded parts initially have a lower temperature than the introduced solvent), the solvent vapor condenses on the surface of the molded part. The solvent condensed on the surface of the molded part slightly dissolves the surface of the molded part, thereby closing pores on the surface and thereby smoothing the surface. How much vapor condenses on the surface of the molded part depends substantially on the temperature difference between the molded part and the solvent vapor introduced. In addition, the amount of condensate that forms on the surface of the molded part is decisive for the degree of dissolution and thus for the effective smoothing of the surface.

It is therefore important in the method according to the invention that, on the one hand, the correct vapor temperature of the solvent is achieved since insufficient vapor is formed at too low temperatures and the surface of the molded part is not sufficiently partially dissolved. In addition, if the vapor temperatures are too low, a solvent condensate can settle on the surface of the molded part, but the temperature of the condensate can be too low to ensure the partial dissolution of the surface. It is therefore particularly advantageous for many molded part material/solvent combinations if the solvent is heated to a temperature of over 100° C.

On the other hand, excessively high vapor temperatures can cause the partial dissolution of the surface of the molded part, which can lead to a change in the geometry of the molded part, or as a result of which the formation of droplets or noses is promoted. Furthermore, excessive dissolution of the surface during the subsequent vacuum drying can lead to the formation of bubbles on the surface.

On the other hand, the molded parts introduced into the interior must reach a specific temperature before introducing the heated solvent so that the temperature difference between the molded part and the introduced solvent vapor causes a specific amount of condensate to be generated on the surface of the molded part.

Ultimately, the parameters (internal temperature of the interior of the pressure-tight container or temperature of the molded part, temperature of the solvent and pressure in the interior of the pressure-tight container, and possibly pressure in the interior of the solvent container) must be adapted to one another depending on the solvent used and the material of the molded part, such that a specific amount of solvent condensate forms on the surface of the molded part to be treated, which causes the desired smoothing effect. The temperature of the molded part is in any case lower than the temperature of the solvent or the solvent vapor. At the same time, the pressure in the interior of the pressure-tight container is lower than the pressure in the interior of the solvent container, both of which can have a negative pressure or a vacuum to a large extent.

By introducing the solvent into the negative pressure interior of the pressure-tight container and the sudden evaporation of the solvent or by introducing the solvent vapor into the negative pressure interior of the pressure-tight container, the temperature in the interior of the pressure-tight container increases steadily. The condensation of the solvent vapor brings about a pressure reduction in the interior of the pressure-tight container, as a result of which further solvent is continuously introduced into the interior and suddenly evaporates or further solvent vapor is continuously introduced into the interior.

The valve remains open until a specified temperature is reached in the interior of the pressure-tight container. The temperature to be achieved in the interior of the pressure-tight container (target temperature or specified second temperature) is selected so that only as much condensate forms on the surface of the molded part that is sufficient for the desired smoothing effect.

If the valve is kept open for too long, the temperature in the interior of the pressure-tight container can rise above the desired target temperature, which can lead to an excessive amount of condensate on the surface of the molded part and thus to excessive dissolution of the surface of the molded part. If the surface of the molded part is too strongly dissolved by the solvent condensate, material bubbles can form during the subsequent vacuum drying (step S5), since the solvent-plastics material mixture formed on the surface can start to boil. When the surface hardens at the same time, bubbles or craters can then form.

It has proven to be advantageous if the valve is kept open for a time between 1 s and 600 s. A valve opening time of 5 s to 300 s is particularly advantageous. However, it should be noted that the valve opening time depends on the design of the valve and the valve opening time may have to be adapted to the valve diameter.

It has proven advantageous to rotate the molded parts introduced into the pressure-tight container during the vaporization phase in the interior or alternatively to rotate the molded parts rigidly arranged in the interior together with the interior or with the pressure-tight container. This can significantly reduce the formation of droplets.

The avoidance or the considerable reduction of the formation of droplets can alternatively or additionally also be brought about by means of a swirling unit, for example a fan, which is arranged in the interior of the pressure-tight container and swirls the introduced solvent vapor. Such a swirling of the introduced solvent vapor can also be brought about or promoted by the pressure difference between the interior of the solvent container and the interior of the pressure-tight container.

After introducing the heated solvent in step S4, the molded parts are dried in step S5. In one embodiment of the invention, the molded parts can be removed from the pressure-tight container for drying.

In an alternative embodiment of the invention, which has been found to be advantageous, it is provided that the molded parts are dried in the interior of the pressure-tight container which has the negative pressure. This has the advantage that the drying process takes place considerably faster in the case of negative pressure or vacuum. It is particularly advantageous if the solvent vapor in the interior of the pressure-tight container and, if necessary, the solvent condensate formed on the interior wall and accumulated on the bottom of the interior is suctioned off in a step S4.1 immediately before drying the molded parts. The suction of solvent can also take place during the entire drying process. This has the advantage that already condensed solvent can run off directly and does not have to be evaporated again before it is removed from the chamber. This means that the molded part can be dried within a few seconds.

The suctioned off solvent vapor or solvent condensate can then be filtered and cleaned, if necessary, and then returned to the solvent container. This means that the solvent can be used in a cycle. This has the technical advantage that there are no materials or other waste that need to be disposed of during the process. The process is therefore a resource-saving, efficient method. In addition, suctioning off the solvent ensures that the user never comes into direct contact with the solvent.

Particularly efficient vacuum-drying (or negative pressure drying) can be achieved if the generation of the negative pressure/vacuum in the pressure-tight chamber is interrupted by a controlled inflow of a transport gas. In one embodiment of the invention, such a transport gas can be carried out cyclically, i.e. the generation of the negative pressure/vacuum is interrupted cyclically. This has the technical advantage that even vacuum pumps with a lower suction power can completely remove the solvent residues from the interior of the pressure-tight container. In order to prevent the solvent from condensing again on the surface of the molded parts due to the pressure increase in the interior of the pressure-tight container, which is caused by the supply of the transport gas, it is particularly advantageous if the inflowing amount of transport gas is controlled and the pressure in the pressure-tight interior does not increase too much. A pressure increase from 8 mbar to approximately between 50 mbar and 100 mbar and a subsequent renewed evacuation to 8 mbar has proven to be particularly advantageous and efficient. In the event that an oxygen-containing gas, such as air, is used as the transport gas, "keeping the pressure low" (i.e. the pressure is kept below 100 mbar) also has the technical advantage that yellowing of the parts is prevented due to oxidation. This risk would exist in the event that a lot of oxygen penetrates the chamber during the drying process, since the molded parts are still at an elevated temperature at this point in time and are therefore very sensitive to oxidation, for example in the case of molded parts made of polyamide.

After vacuum-drying the molded part, it can be removed from the pressure-tight container in the last step, with the interior of the pressure-tight container optionally being able to be cooled to a specific temperature before the molded part is removed. Especially in the case of vacuum-drying directly before the molded parts are removed, the efficient vacuum drying described above with the supply of a transport gas is to be preferred to drying without the supply of a transport gas.

The steps S4, S5 and, if applicable, S4.1 are referred to together as a cycle (processing cycle).

In one embodiment of the invention, it can be provided that this cycle, i.e. steps S4 and S5 and, if necessary, step S4.1, be repeated a plurality of times. This has proven to be particularly advantageous when the partial dissolution of the surface, which is brought about by the introduction of the solvent vapor in step S4, cannot achieve a sufficient smoothing effect. This can be the case, for example, if, due to the material of the molded part and the solvent used, only very short vaporization times are possible without damaging the molded part.

Figure 3:
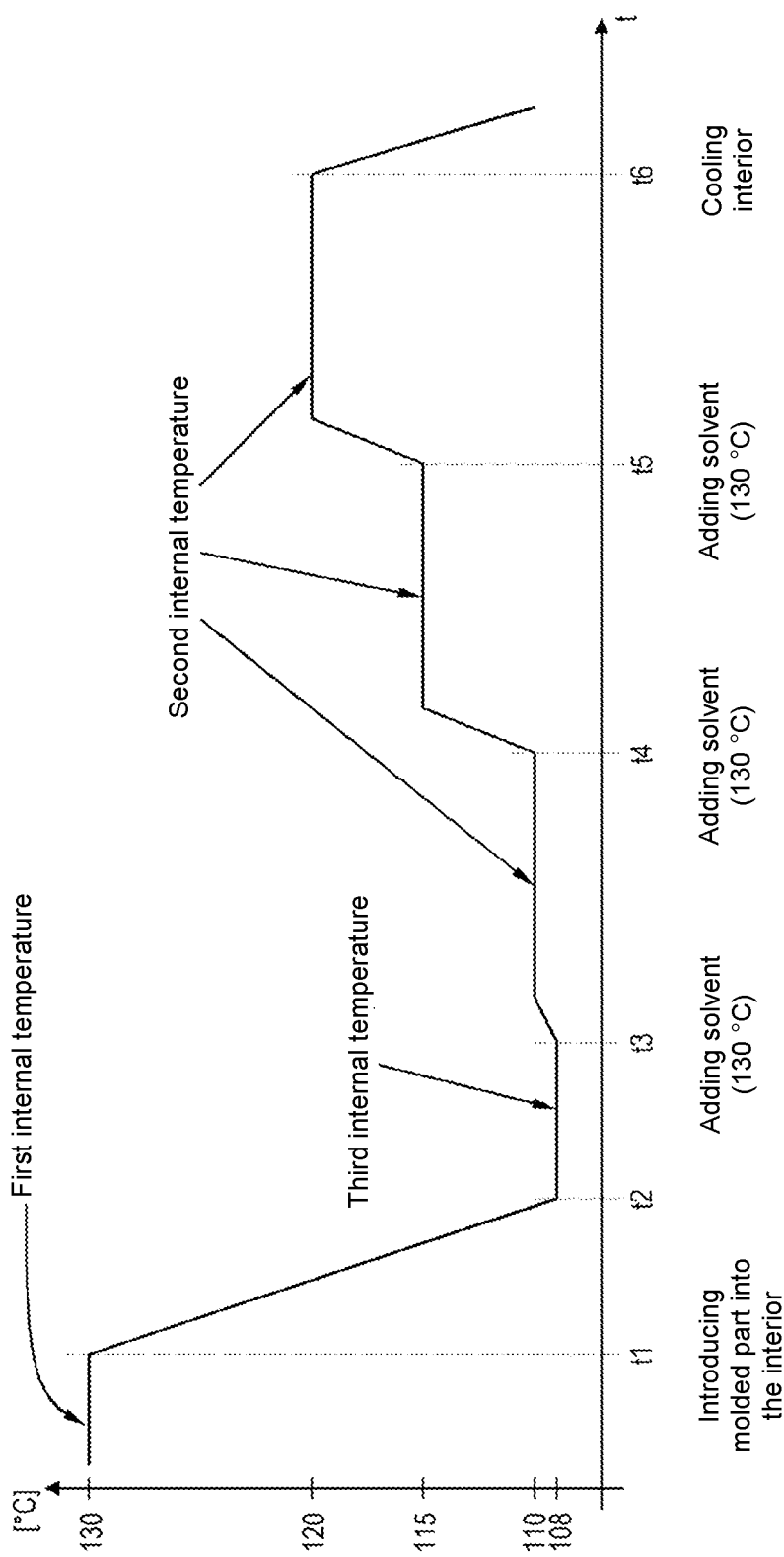
FIG. 3 is a first example of a temperature profile of the internal temperature of an interior of a surface treatment device, a solvent being added to the interior three times.

After the first cycle, i.e. after the first vaporization and the first vacuum-drying of the molded parts, the temperature of the molded part is higher than at the beginning of the first cycle, because the introduction of the solvent vapor increases the temperature in the interior of the pressure-tight container and thus also the temperature of the molded part. This means that in the next cycle, vapor must be supplied to the interior of the pressure-tight container until the interior or the molded part reaches a temperature at which sufficient condensate is deposited on the surface of the molded part to achieve the desired smoothing effect (for example, as shown in FIG. 3). Since the temperature of the molded part is higher at the beginning of the second cycle than at the beginning of the first cycle (if the molded part is not cooled between two cycles), the temperature difference between the temperature of the molded part and the temperature of the solvent is no longer large enough to prevent the addition of the same amount of solvent as in the first cycle to generate sufficient condensate on the surface of the molded part.

In principle, this cycle can be repeated as often as required. However, there are limits to the number of repetitions where, due to the repetitions, the temperature of the molded part reaches a value at which the molded parts would be destroyed. An exemplary temperature profile of the internal temperature of the interior of the pressure-tight container is described in more detail with reference to FIGS. 3 to 6.

In order to compensate for the lower temperature difference between the molded part and the solvent introduced after each cycle, provision can also be made to further heat the solvent accordingly after each cycle in order to achieve the desired temperature difference between the temperature of the molded part and the temperature of the solvent.

Figure 4:
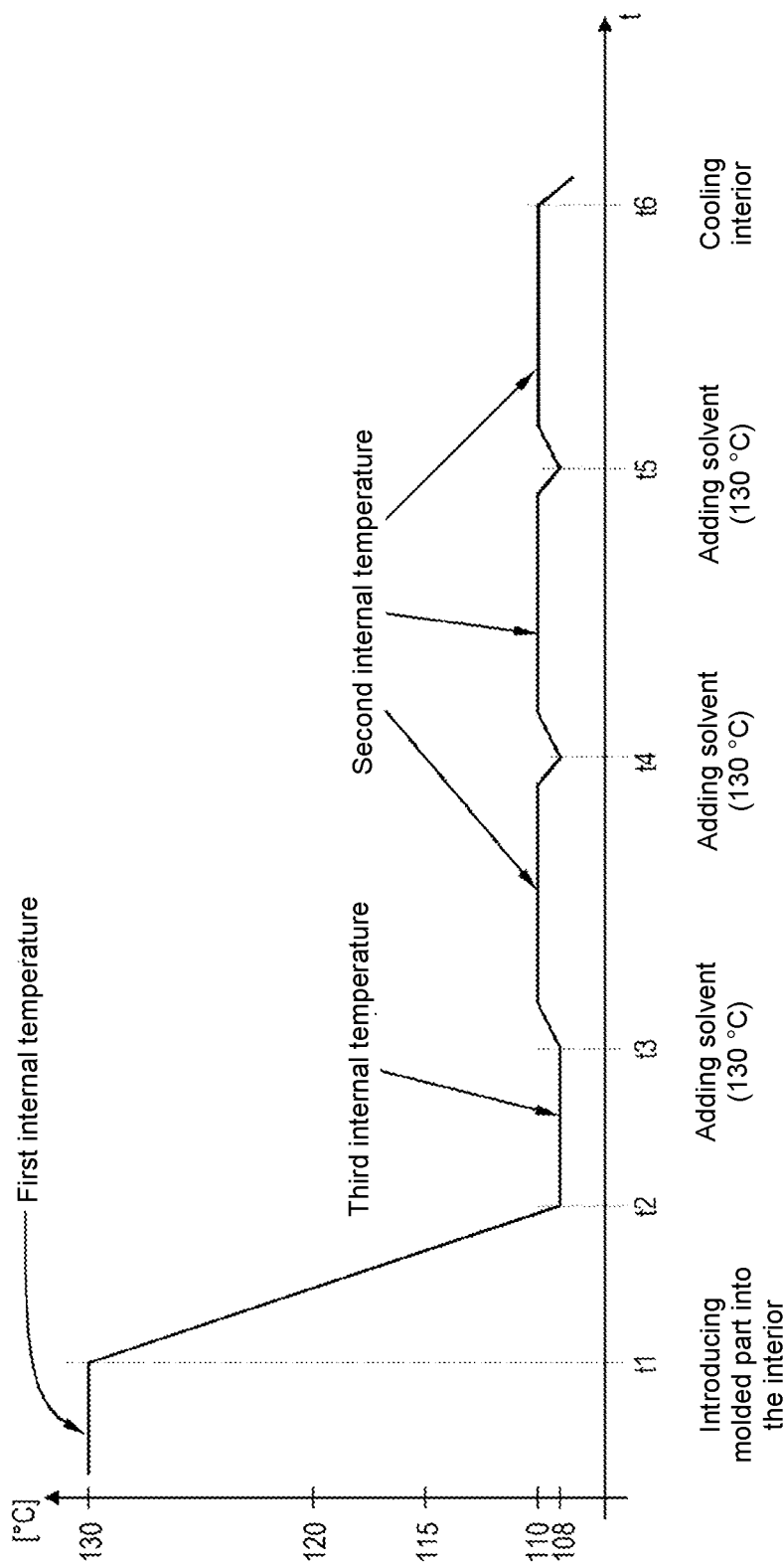
FIG. 4 is a second example of a temperature profile of the internal temperature of an interior of a surface processing device, a solvent being added to the interior three times.

In an alternative embodiment of the method, the temperature of the interior of the pressure-tight container can be reduced before the heated solvent is introduced in the next cycle, preferably until the desired temperature difference between the molded part and the solvent to be introduced is reached again. For example, the temperature of the interior can be reduced to the value at which solvent was introduced into the interior in the first cycle (as shown in FIG. 4). The cooling can already be achieved here indirectly by means of the evaporative cooling during the generation of the negative pressure or the vacuum. In this alternative embodiment of the method, the molded part can be vaporized as often as desired, i.e. as many cycles as desired can be repeated. However, it has been shown that, depending on the material of the molded part and depending on the solvent used, between three and six cycles can be sufficient to achieve an optimal smoothing result.

The method according to the invention is particularly suitable for molded parts that are produced in the SLS (selective laser sintering) method, MJF (MultiJet fusion) method, HSS (high speed sintering) method, FDM (fused deposition modeling) method, and SLA (stereolithography) method. The method according to the invention is particularly advantageous for molded parts which are produced in particular in a powder-based layer construction, in which individual layers are fused together, such as the SLS method, the MJF method, or the HSS method, because with these powder-based processes the surface is particularly rough and has pores.

For the production of the molded parts, polymers, in particular the materials mentioned below, can be used which are particularly well suited for the smoothing of the surface according to the invention of the molded parts produced from them:

polyester, PA12 (polyamide 12), PP (polypropylene), TPU (thermoplastic polyurethane), TPE (thermoplastic elastomers), PA11 (polyamide 11), PA6 (polyamide 6), PA6.6 (polyamide 6.6), glass-filled polyamide, ceramic-filled polyamide, PU (polyurethane), ABS (acrylonitrile-butadiene-styrene copolymers), PEK (polyether ketone), PEI (polyetherimide), PPS (polyphenylene sulfide), and PLA (polylactide), cyanate ester, materials based on (meth)acrylates, and combinations thereof.

However, other materials can also be used, provided they are suitable for a 3D printing method and the surface of the molded parts produced with them can be partially dissolved by means of a solvent vapor.

The solvents mentioned below have proven suitable as solvents (which in the context of the present invention also include high boilers), although other solvents not mentioned here can also be used:

acetaldehyde, acetamide, acetone, acetonitrile, acetophenone, acetylene, aliphatic hydrocarbons, in particular cyclohexane, cyclohexene, diisobutylene, hexane, octane, n-pentane and terpinene, alcohols, in particular benzyl alcohol, butylene glycol, butanol, ethanol, ethylene glycol, methanol, ethanol, ethylene glycol, methanol, allyl alcohol, n-propanol and isopropanol, amyl acetate, aniline, anisole, benzine, benzaldehyde, benzene, chlorobenzene, decalin, dioxane, dimethylamide, diemethylformaid, diethyl ether, dimethylformamide, dimethyl sulfide, dimethyl sulfoxide, ethylbenzene, ethyl acetate, formaldehyde, formamide, furfural, halogenated hydrocarbons, in particular chlorobromomethane, chloroform, ethylene chloride, methylene chloride, perchlorethylene, tetrachloromethane, trichloroethane and trichlorethylene, menthone, methyl tert-butyl ether, methylethylene ketone, nitrobenzene, phenols, phenylethyl alcohol, propanol, pyridine, styrene, tetrahydrofuran, tetrahydronaphthalene, tetrahydronaphthalene, and combinations thereof.

Solvents that are approved for processing plastics material for food have proven to be particularly advantageous (for example, according to Regulation (EU) Ser. No. 10/2011 of the Commission of Jan. 14, 2011 on materials and objects made of plastics material that are intended to come into contact with food), as these applications benefit in particular from a smooth surface of the molded parts. Surfaces smoothed according to the invention are water-repellent and thus efficiently prevent possible germ growth. This class of solvents includes benzyl alcohol.

The use of benzyl alcohol also has the advantage that the solvent is prevented from spreading and that any solvent that escapes due to handling errors is easily disposed of since it is a non-volatile substance. In addition, benzyl alcohol has a very low olfactory limit, which means that possible solvent contamination can be registered well below the maximum workplace concentration or the health-endangering amount and below the explosion limit.

Before the surface of a molded part produced in a 3D printing method is treated, the molded part can be mechanically processed, for example blasted, in order to remove excess powder, for example. This is particularly advantageous because powder residues would also be partially dissolved and then harden on the surface. If there is too much residual powder on the surface, the smoothing result can be negatively affected.

In addition, the molded parts can be blasted with plastics material balls before or after smoothing in order to achieve a compacting of the surface. It is advantageous here if the plastics material balls have a lower degree of hardness than the material of the molded part; this ensures that the surface is compacted without damaging the surface.

In one embodiment of the invention, the molded parts can be colored before or after smoothing and/or can be impregnated or painted after smoothing.

FIG. 3 shows a temperature profile of the interior of the pressure-tight container or of the molded part introduced into this interior while carrying out a method according to the invention in which three cycles (steps S4 to S5) are carried out, wherein the temperature of the molded part or the internal temperature of the interior increases.

A cycle can, however, also include multiple vaporizations of the surface with the vaporous solvent, the internal temperature being able to be adjusted between each vaporization of the surface. With the temperature profile shown in FIG. 3, the three cycles shown and described below can also be part of a single cycle. This also applies to the other temperature profiles shown with reference to FIGS. 4 to 7.

For the example shown in FIG. 3, the material PA12 was used to produce the molded part. Benzyl alcohol was used as the solvent.

The interior of the pressure-tight container is first brought to a first internal temperature of about 130° C. At time t1, the molded part is placed in the interior and the pressure-tight container is closed in a pressure-tight manner, and a vacuum is generated to a large extent in the interior. The molded part placed in the interior is heated by the radiant heat of the interior, as a result of which the first interior temperature simultaneously drops to a third internal temperature, which is approximately 108° C. At time t2, the temperature of the molded part corresponds to a large extent to the third internal temperature.

At time t3, which can be immediately after time t2, the solvent heated to 130° C. is added, which evaporates suddenly or enters the interior of the pressure-tight container as solvent vapor. The solvent vapor then condenses on the surface of the molded part, since the temperature difference between the temperature of the molded part and the temperature of the solvent vapor is about 22° C.

When the solvent is added, the internal temperature rises by about 2° C. to a second internal temperature (in this case, about 110° C.). After this second internal temperature has been reached, the supply of solvent is stopped and vacuum-drying of the molded part is carried out. The solvent vapor still in the interior can be suctioned off. Solvent condensate present on the inner walls of the interior or on the bottom of the interior can also be suctioned off. The drying process then takes a few seconds.

After the molded part has dried, solvent is added again at time t4, which molded part still has a temperature of about 130° C. Since the temperature difference between the molded part and the solvent introduced is now lower (in this case, approx. 20° C.) than at time t3, the second internal temperature and thus the temperature of the molded part must be increased even further (in this case, to approx. 115° C.) by adding the solvent, so that sufficient solvent vapor can condense on the surface of the molded part for the desired smoothing effect. The molded part is then vacuum-dried again.

The third cycle is started at time t5, in which solvent heated to 130° C. is added again. Since at time t5 the temperature difference between the temperature of the molded part and the added solvent is even smaller (in this case, approx. 15° C.) than at time t4, the second internal temperature and thus the temperature of the molded part must be increased even further by adding the solvent, present at about 120° C. This ensures that sufficient solvent vapor can also condense on the surface of the molded part for the desired smoothing in the third cycle. The molded part is then vacuum-dried.

Subsequently, at time t6, cooling of the interior and thus of the molded part is initiated. After a specific interior temperature has been reached, in the present case between approximately 105° C. and 110° C., the molded part can be removed from the interior. This cooling process is only optional, i.e. the molded parts can be removed directly after drying. The cooling process, however, has the advantage that the yellowing of the removed molded parts is prevented since the cooling process takes place under negative pressure or under vacuum.

Of course, the interior of the pressure-tight container must be brought to atmospheric pressure before removing the molded parts.

The second internal temperature to be achieved in the second and third cycle can be reduced if the solvent temperature for the second and for the third cycle is increased accordingly. For example, an increase in the solvent temperature from 130° C. to 135° C. in the second cycle can be sufficient that the second internal temperature only needs to be increased from 110° C. to 112° C. in the second cycle, since in this case the temperature difference at time t4 between the temperature of the molded part and the temperature of the solvent is approximately the same as at time t3. However, such an increase in the solvent temperature is only possible if the increased solvent temperature does not lead to excessive dissolution or damage to the surface of the molded part.

FIG. 4 shows a temperature profile of the internal temperature of the interior, the internal temperature of the interior and thus the temperature of the molded part being cooled to a specific value after each cycle.

In this case, too, PA12 was used to manufacture the molded part. Benzyl alcohol was also used in this case as the solvent.

First, the interior of the pressure-tight container is brought to a first internal temperature of about 130° C. At time t1, the molded part is placed into the interior and the interior is closed in a pressure-tight manner. A vacuum is then generated to a large extent in the interior. The temperature difference between the temperature of the molded part and the first internal temperature means that the first internal temperature drops to a third internal temperature by time t2 and the temperature of the molded part rises to this third internal temperature (in this case, approx. 108° C.).

After this third internal temperature has been reached, a solvent heated to 130° C. is added at time t3, which evaporates suddenly in the interior or which already reaches the interior as solvent vapor. The solvent vapor condenses on the surface of the molded part and thereby effects the desired smoothing. By adding the solvent, the internal temperature of the interior and thus also the temperature of the molded part rise from the third internal temperature to the second internal temperature (in this case, approx. 110° C.). As soon as this second internal temperature has been reached, the introduction of the solvent is stopped. The molded part is then vacuum-dried.

After completion of the drying process, the interior is cooled down, preferably to the third internal temperature, as at time t2 (in this case, therefore to approx. 108° C.). This ensures that, in the next cycle, the temperature difference between the temperature of the molded part and the temperature of the solvent is the same as at time t3.

After cooling the interior or the molded part, the solvent heated to 130° C. is added again at time t4. In contrast to the temperature profile shown in FIG. 3, the second internal temperature to be reached after time t4 does not have to be higher in this second cycle than in the first cycle. It is sufficient to bring the second internal temperature in the second cycle to the second internal temperature as in the first cycle (i.e., to about 110° C.) by adding the solvent to the interior. Because of the temperature difference between the temperature of the molded part and the temperature of the solvent at the beginning of the second cycle, sufficient vapor can condense on the surface of the molded part for the desired smoothing. The molded part is then vacuum-dried again and the internal temperature of the interior is lowered again, preferably to the third internal temperature as at time t2.

The third cycle is identical to the second cycle and is initiated at time t5 by adding the solvent heated to 130° C.

The third cycle is completed at time t6 and the interior can be cooled to a specified temperature. The molded parts can then be removed from the pressure-tight container. However, this cooling process can also be dispensed with and the molded part can be removed directly after drying. In this case as well, the cooling process has the advantages mentioned with reference to FIG. 3.

Figure 5:
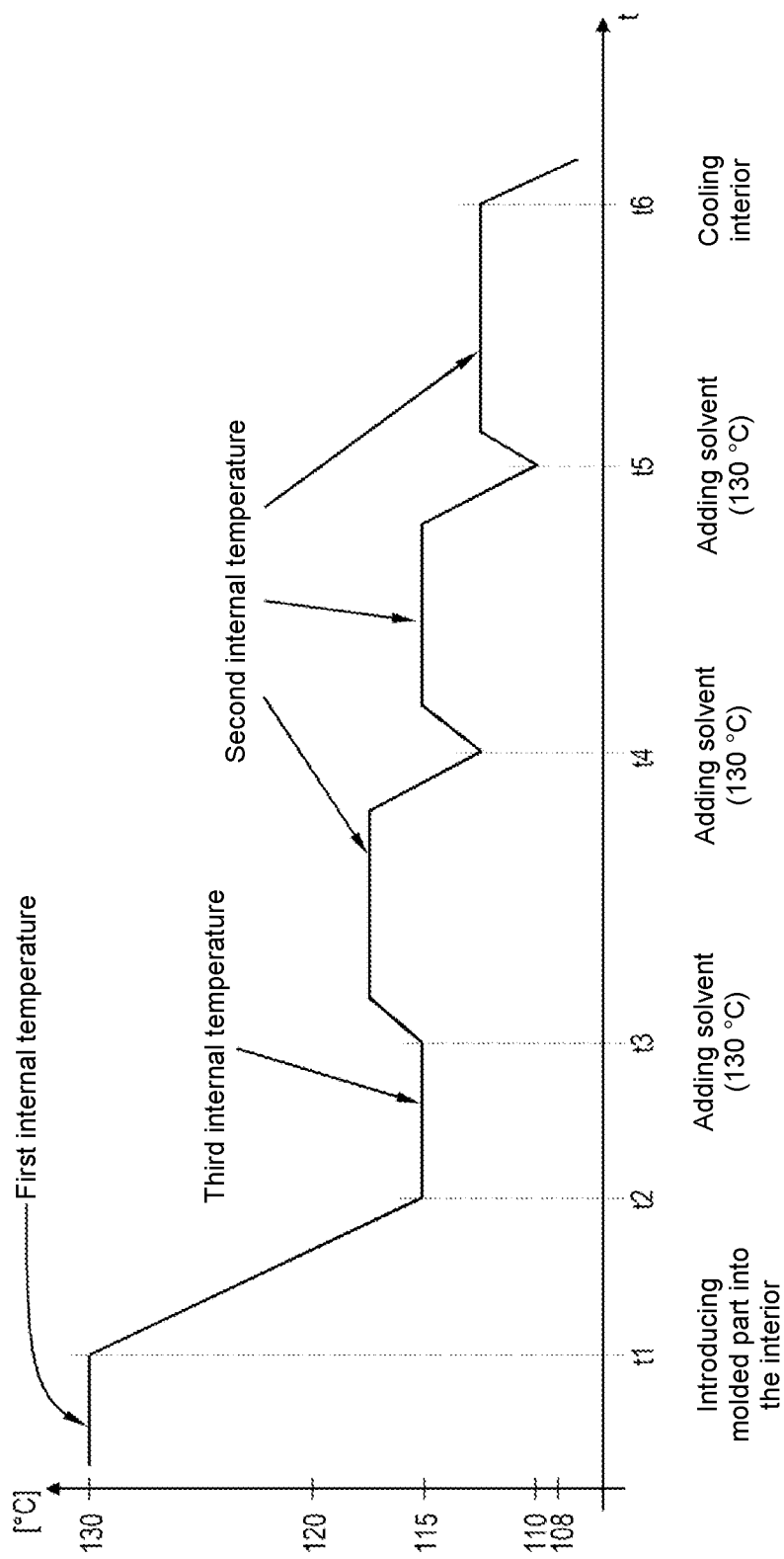
FIG. 5 is a third example of a temperature profile of the internal temperature of an interior of a surface processing device, a solvent being added to the interior three times.

FIG. 5 shows a temperature profile of the internal temperature of the interior, the internal temperature of the interior and thus the temperature of the molded part being cooled to a specific value after each cycle.

In this case, too, PA12 was used to manufacture the molded part. Benzyl alcohol was also used in this case as the solvent.

First, the interior of the pressure-tight container is brought to a first internal temperature of about 130° C. At time t1, the molded part is placed into the interior and the interior is closed in a pressure-tight manner. A vacuum is then generated to a large extent in the interior. The temperature difference between the temperature of the molded part and the first internal temperature means that the first internal temperature drops to a third internal temperature by time t2 and the temperature of the molded part rises to this third internal temperature (in this case, approx. 115° C.).

After this third internal temperature has been reached, a solvent heated to 130° C. is added at time t3, which evaporates suddenly in the interior or which already reaches the interior as solvent vapor. The solvent vapor condenses on the surface of the molded part and thereby effects the desired smoothing. By adding the solvent, the internal temperature of the interior and thus also the temperature of the molded part rise from the third internal temperature (in this case, approx. 115° C.) to the second internal temperature (in this case, approx. 117.5° C.), i.e. by approx. 2.5° C. As soon as this second internal temperature has been reached, the introduction of the solvent is stopped. The molded part is then vacuum-dried.

After the drying process is complete, the interior is cooled down. While in the example shown in FIG. 4 the temperature of the interior was lowered to the temperature as at time t2, in the example shown in FIG. 5 the temperature of the interior is lowered to a temperature below the temperature as at time t2 (in this case, by approx. 5° C. to 112.5° C.). This ensures that at the beginning of the next cycle the temperature difference between the temperature of the molded part and the temperature of the solvent is larger than at the beginning of the previous cycle (at time t3).

After cooling the interior or the molded part, the solvent heated to 130° C. is added again at time t4. In contrast to the temperature profile shown in FIG. 4, the second internal temperature to be reached after time t4 can be lower in this second cycle (in this case, approx. 115° C.) than in the first cycle. Because of the greater temperature difference at time t4 between the temperature of the molded part and the temperature of the solvent, sufficient vapor can nevertheless condense on the surface of the molded part for the desired smoothing. The molded part is then vacuum-dried again and the internal temperature of the interior is lowered again (in this case, to around 110° C.).

The third cycle is identical to the second cycle and is initiated at time t5 by adding the solvent heated to 130° C., whereby the second internal temperature rises to about 112° C.

The third cycle is completed at time t6 and the interior can be cooled to a specified temperature. The molded parts can then be removed from the pressure-tight container. However, this cooling process can also be dispensed with and the molded part can be removed directly after drying. In this case as well, the cooling process has the advantages mentioned with reference to FIG. 3.

The advantage in this case is that due to the constant cooling, the surface of the molded part is dissolved less in each cycle, which results in gentler smoothing. The higher temperatures in the first cycle have the advantage that a quick first smoothing is achieved.

It can also be advantageous to reduce the temperature of the solvent after each cycle, for example by 2° C. to 5° C. This also applies to the variants shown with reference to FIGS. 3, 4, 6, and 7.

Figure 6:
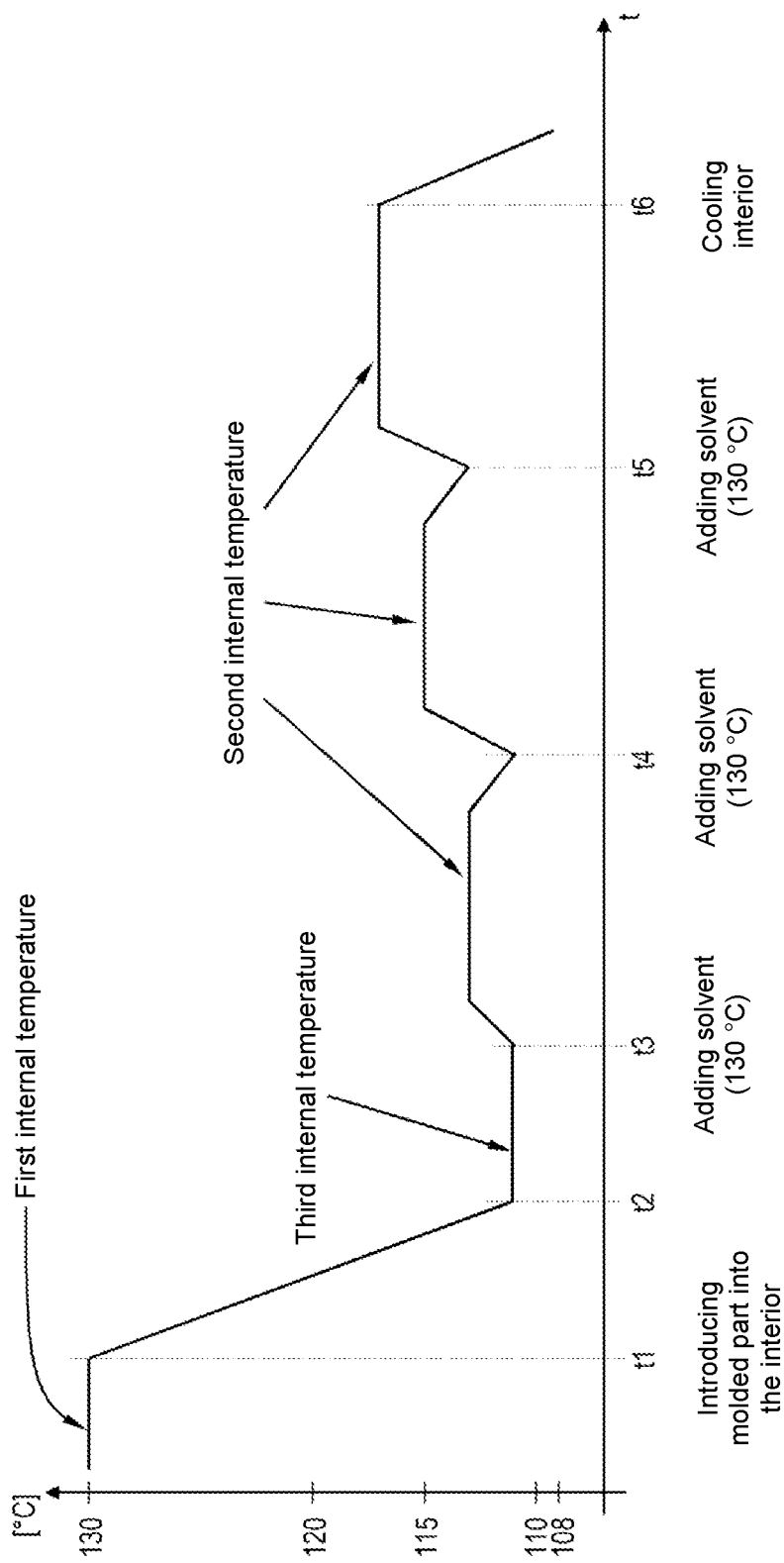
FIG. 6 is a fourth example of a temperature profile of the internal temperature of an interior of a surface processing device, a solvent being added to the interior three times.

FIG. 6 shows a temperature profile of the internal temperature of the interior, the internal temperature of the interior, and thus the temperature of the molded part being cooled to a specific value after each cycle; in contrast to the temperature profile shown in FIG. 5, the second internal temperature in each cycle is higher than in the previous cycle.

In this case, too, PA12 was used to manufacture the molded part. Benzyl alcohol was also used in this case as the solvent.

First, the interior of the pressure-tight container is brought to a first internal temperature of about 130° C. At time t1, the molded part is placed into the interior and the interior is closed in a pressure-tight manner. A vacuum is then generated to a large extent in the interior. The temperature difference between the temperature of the molded part and the first internal temperature means that the first internal temperature drops to a third internal temperature by time t2 and the temperature of the molded part rises to this third internal temperature (in this case, approx. 111° C.).

After this third internal temperature has been reached, a solvent heated to 130° C. is added at time t3, which evaporates suddenly in the interior or which already reaches the interior as solvent vapor. The solvent vapor condenses on the surface of the molded part and thereby effects the desired smoothing. By adding the solvent, the internal temperature of the interior and thus also the temperature of the molded part rise from the third internal temperature (in this case, approx. 111° C.) to the second internal temperature (in this case, approx. 113° C.), i.e. by approx. 2° C. As soon as this second internal temperature has been reached, the introduction of the solvent is stopped. The molded part is then vacuum-dried.

After the drying process is complete, the interior is cooled down (in this case, by approx. 2° C. to approx. 111° C.). This ensures that at the beginning of the next cycle the temperature difference between the temperature of the molded part and the temperature of the solvent is approximately the same as at the beginning of the previous cycle (at time t3).

After cooling the interior or the molded part, the solvent heated to 130° C. is added again at time t4. In contrast to the temperature profile shown in FIG. 5, the second internal temperature to be reached after time t4 can be higher in this second cycle (in this case, approx. 115° C.) than in the first cycle. The molded part is then vacuum-dried again and the internal temperature of the interior is lowered again (in this case, by around 2° C. to around 113° C.).

The third cycle is identical to the second cycle and is initiated at time t5 by adding the solvent heated to 130° C., whereby the second internal temperature rises to about 117° C.

The third cycle is completed at time t6 and the interior can be cooled to a specified temperature. The molded parts can then be removed from the pressure-tight container. However, this cooling process can also be dispensed with and the molded part can be removed directly after drying. In this case as well, the cooling process has the advantages mentioned with reference to FIG. 3.

Figure 7:
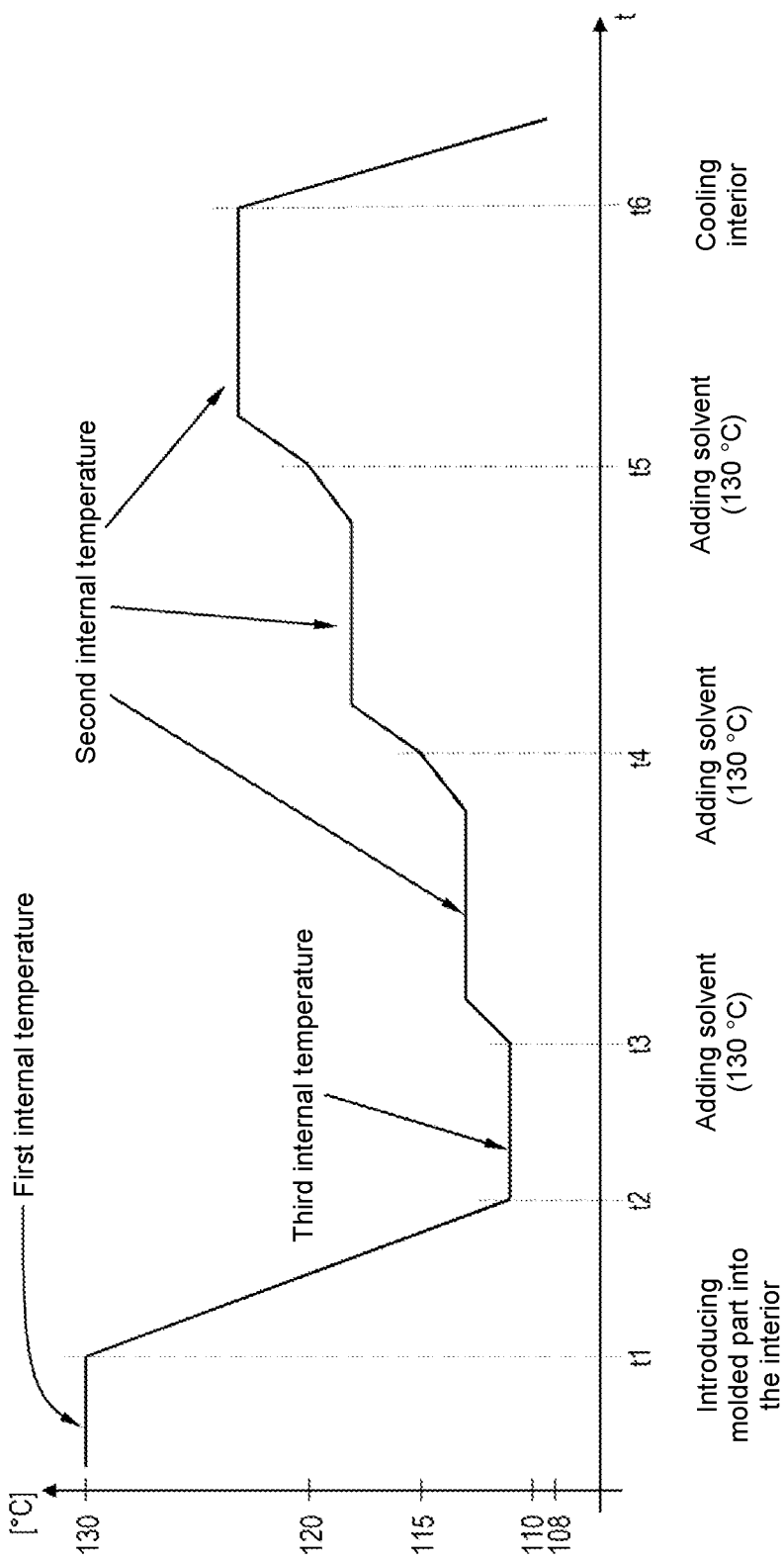
FIG. 7 is a fifth example of a temperature profile of the internal temperature of an interior of a surface processing device, a solvent being added to the interior three times.

FIG. 7 shows a temperature profile of the internal temperature of the interior, the internal temperature of the interior, and thus the temperature of the molded part being further increased.

In this case, too, PA12 was used to manufacture the molded part. Benzyl alcohol was also used in this case as the solvent.

First, the interior of the pressure-tight container is brought to a first internal temperature of about 130° C. At time t1, the molded part is placed into the interior and the interior is closed in a pressure-tight manner. A vacuum is then generated to a large extent in the interior. The temperature difference between the temperature of the molded part and the first internal temperature means that the first internal temperature drops to a third internal temperature by time t2 and the temperature of the molded part rises to this third internal temperature (in this case, approx. 111° C.).

After this third internal temperature has been reached, a solvent heated to 130° C. is added at time t3, which evaporates suddenly in the interior or which already reaches the interior as solvent vapor. The solvent vapor condenses on the surface of the molded part and thereby effects the desired smoothing. By adding the solvent, the internal temperature of the interior and thus also the temperature of the molded part rise from the third internal temperature (in this case, approx. 111° C.) to the second internal temperature (in this case, approx. 113° C.), i.e. by approx. 2° C. As soon as this second internal temperature has been reached, the introduction of the solvent is stopped. The molded part is then vacuum-dried.

After the drying process is complete, the interior (and thus the molded part) is further heated (in this case, by approx. 2° C. to approx. 115° C.).

After heating the interior or the molded part, the solvent heated to 130° C. is added again at time t4. The second internal temperature rises by about 3° C. to about 118° C. The molded part is then vacuum-dried again and the internal temperature of the interior is further increased again (in this case, by around 2° C. to around 120° C.).

The third cycle is identical to the second cycle and is initiated at time t5 by adding the solvent heated to 130° C., whereby the second internal temperature rises to about 123° C.

The third cycle is completed at time t6 and the interior can be cooled to a specified temperature. The molded parts can then be removed from the pressure-tight container.

In the examples of a temperature profile shown with reference to FIGS. 3 to 7, three cycles (vaporizing of the surface and subsequent drying) were carried out in each case. Depending on the desired smoothness and depending on the material of the molded part and the solvent used, more than three or less than three cycles can also be carried out.

In the examples of a temperature profile shown with reference to FIGS. 3 to 7, the internal temperature of the pressure-tight container was first brought to a specified first internal temperature (in this case, 130° C.), before the (cold) molded part was introduced into the interior (at time t1).

As an alternative to this, however, the molded part can also be introduced into the "cold" interior and then the interior can be brought to the desired first internal temperature (for example to 130° C.). In the examples shown with reference to FIGS. 3 to 7, it would be sufficient in this case to bring the interior (including the cold molded part incorporated therein) to a first internal temperature at which a subsequent lowering to a third interior temperature is no longer necessary. For example, in the example shown in FIG. 3, the interior with the molded part arranged therein can be heated until a temperature of approximately 108° C. is reached. The solvent can then be added directly. It is advantageous in this case to heat the interior and thus the molded part under vacuum.

In the examples shown with reference to FIGS. 3 to 7, the same solvent was added in each cycle. Alternatively, a different solvent can be added in at least one cycle than in the other cycles. In the case of molded parts with particularly coarse-pored surfaces, for example, a solvent can be added in the first cycle that causes the surface to dissolve more quickly and/or more intensely. This also allows larger pores to be closed. A solvent can then be added in each of the following cycles, with which the surface is then only slightly and/or more slowly dissolved.

In the examples shown in FIGS. 3, 6, and 7, the second internal temperature rises successively with each cycle. In the example shown in FIG. 4, the second internal temperature remains constant over a plurality of cycles. In the example shown in FIG. 5, the second internal temperature drops successively with each cycle.

The temperature profiles shown in FIGS. 3 to 7 can also be combined. In other words, the method according to the invention can also be carried out in such a way that the second internal temperature rises or falls in two or more successive cycles and falls or rises in cycles following these cycles. The temperature profile can thus be optimally adapted to the surface smoothness to be achieved, depending on the materials of the molded parts and depending on the solvent used, in particular when two or more different solvents are used.

The experiments described above with reference to FIGS. 3 to 7 were repeated for
TPU as the material of the molded part and benzyl alcohol as a solvent, and
PA12 as the material of the molded part and methylene chloride as a solvent.

Example: TPU as the Material of the Molded Part and Benzyl Alcohol as a Solvent Because TPU has a lower melting point than PA12, the temperatures shown in FIGS. 3 to 7 had to be reduced by about 15° C. in each case.

Example: PA12 as the Material of the Molded Part and Methylene Chloride as Solvent The temperatures of the temperature profiles shown in FIGS. 3 to 7 are between approximately 20° C. and 40° C. in this case. Specifically, a molded part made of PA12 with the temperature profile shown in FIG. 3 was carried out in an experiment, wherein the temperature at time t2 was about 20° C., and the second internal temperature was about 23° C. for the first cycle, about 29° C. for the second cycle, and about 35° C. for the third cycle. The pressure in the interior of the pressure-tight container was set to below atmospheric pressure (specifically to about 450 hPa). This slight negative pressure is sufficient for the methylene chloride to be able to evaporate in the interior at around 20° C.

Two more attempts are described below.

Experiment 1

The molded parts are produced with the polyamide PA2200 in a 3D printing method.

The interior 21 of the pressure-tight container is heated to a temperature of 135° C. (step S1, first interior temperature).

The molded parts are introduced into the interior 21 (step S2) and a vacuum to a large extent (approximately 7 mbar) is generated in the interior 21. By opening and closing the process chamber while introducing the molded parts into the interior, the interior cools down again somewhat (to about 125° C., 3rd interior temperature).

The solvent container is filled with benzyl alcohol as the solvent. Before or during steps S1 and S2, the solvent is heated to a temperature of about 140° C. (step S3), a pressure of 130 mbar being reached in the solvent container. Based on the vapor pressure curve of benzyl alcohol, this ensures that part of the solvent evaporates.

By opening the valve 50 for a period of about 16 s and due to the pressure difference between the interior 21 and the solvent container 40, solvent flows into the interior 21 in step S4 and condenses on the molded parts, since these have a lower temperature than the inflowing solvent vapor. The pressure in the solvent container 40 drops to about 100 mbar, while the pressure in the interior 21 rises to about 80 mbar. At the same time, the temperature in the interior 21 increases to about 126° C. (2nd interior temperature).

The solvent is then suctioned off from the interior 21 (step S4.1) and the molded part is dried in a vacuum (step S5). In the process, the temperature in the interior 21 drops to a temperature below the 2nd interior temperature (<126° C.) as a result of the evaporation of the solvent, whereby the temperature can also drop below the 3rd interior temperature (<125° C.). This ensures that the temperature of the solvent vapor is always above the temperature of the interior 21 and thus also above the temperature of the molded parts to be smoothed. This ensures that solvents condense on the surface of the molded parts and that these are further smoothed in the subsequent vaporization cycles.

Steps S4, S4.1, and S5 are then repeated 18 times before the component is finally dried.

Experiment 2

The molded parts are produced with a thermoplastic polyurethane (TPU) in a 3D printing method.

The interior 21 of the pressure-tight container is heated to a temperature of approximately 130° C. (step S1, first interior temperature).

The molded parts are introduced into the interior 21 (step S2) and a vacuum to a large extent (approximately 8 mbar) is generated in the interior 21. By opening and closing the process chamber 20, the interior 21 cools down again somewhat in this process step.

The molded parts then remain in the preheated, evacuated chamber for 30 minutes. This has the advantage that the molded parts are gently heated and the thermal stress that is triggered when the hot solvent vapor flows in can be reduced to a minimum. At the same time, this allows any water that may be bound in the material to escape gently and reduces the amount of condensed solvent during subsequent vaporization. This does not prevent the formation of bubbles caused by overcooking the surface. After this time, the interior 21 is at a temperature of 105° C. (3rd interior temperature).

The solvent container 40 is filled with benzyl alcohol as a solvent. Before or during steps S1 and S2, the solvent is heated to a temperature of about 135° C. (step S3), a pressure of about 120 mbar being reached in the interior 70. Based on the vapor pressure curve of benzyl alcohol, this ensures that part of the solvent evaporates.

By opening the valve 50 for a period of about 25 s and due to the pressure difference between the interior 21 and the interior 70, solvent flows into the interior 21 in step S4 and condenses on the molded parts since these have a lower temperature than the inflowing solvent vapor. The pressure in the solvent container 40 drops to about 90 mbar, while the pressure in the interior 21 rises to about 70 mbar. At the same time, the temperature in the interior 21 increases to about 110° C. (2nd interior temperature).

The solvent is then suctioned off (step S4.1) and the component is dried in a vacuum (step S5). In the process, the temperature in the interior 21 drops to a temperature below the 2nd interior temperature (<110° C.) as a result of the evaporation of the solvent.

The temperature in the interior 21 is then reduced, which can be achieved, for example, by briefly opening the container 20 followed by closing the container 20 again and evacuating the interior 21. This means that a temperature below the 2nd interior temperature, preferably exactly the 3rd interior temperature, is reached.

Steps S4, S4.1, and S5 are then repeated twice before the component is finally dried.

Figure 8:
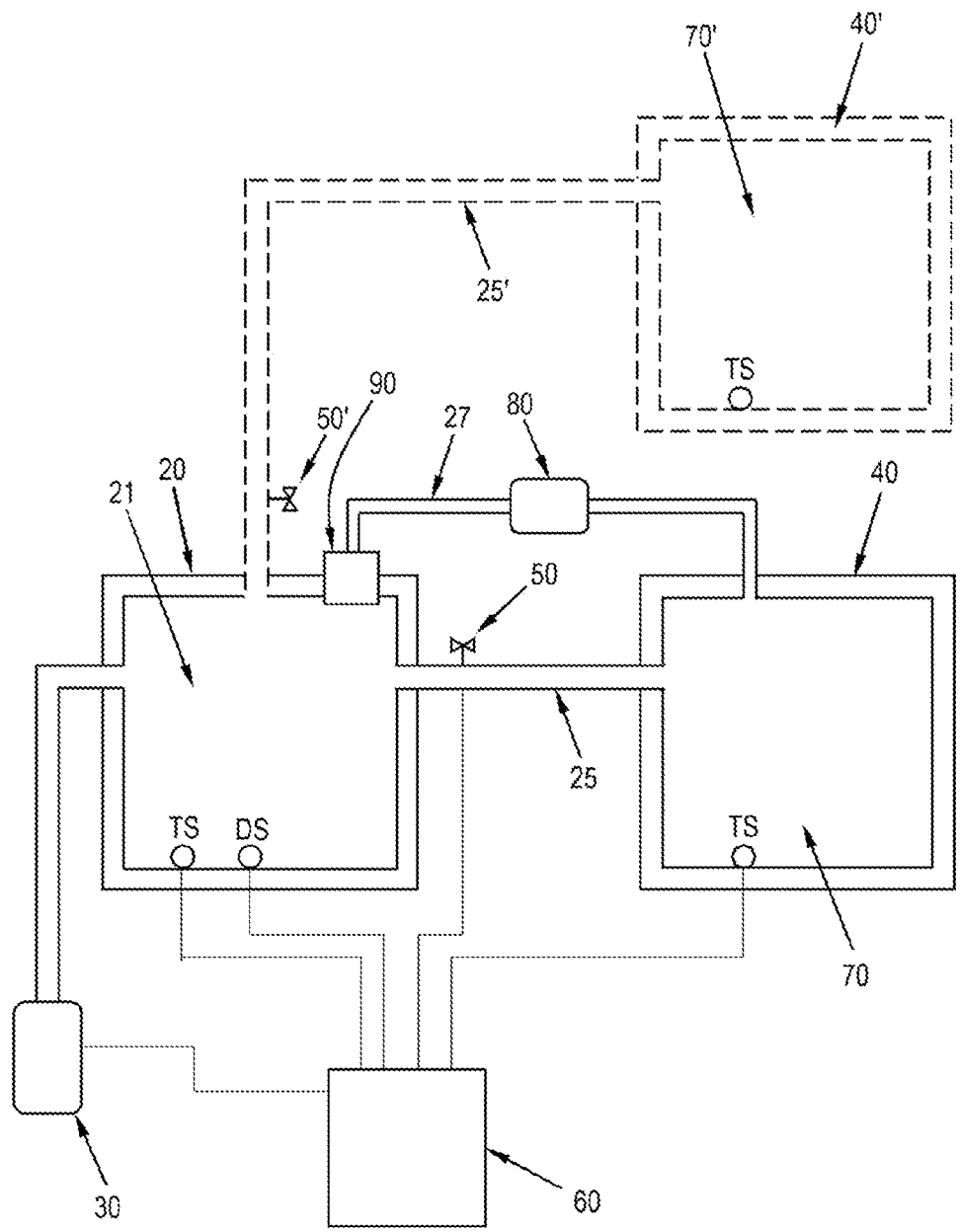
FIG. 8 is a schematic representation of a device according to the invention for treating the surface of at least one molded part produced in a 3D printing method.

FIG. 8 shows, in a schematic manner, a device according to the invention for treating the surface of at least one molded part produced in a 3D printing method.

The device substantially comprises a pressure-tight container 20 into whose interior 21 the molded part to be treated is introduced. The pressure-tight container 20 is designed so that a negative pressure, in particular a vacuum to a large extent, can be generated in the interior 21.

The device further comprises a solvent container 40 for storing the solvent 70 to be introduced into the interior 21. The solvent container 40 can also be designed to be pressure-tight, in particular in such a way that a negative pressure can be generated in the interior 70.

The solvent container 40 and the pressure-tight container 20 are connected to one another via a supply line 25, wherein a valve 50 can be arranged in the supply line with which the supply of solvent from the solvent container 40 into the interior 21 of the container 20 can be controlled.

The pressure-tight container 20 and the solvent container 40 are each designed such that, on the one hand, the interior 21 of the pressure-tight container 20 and, on the other hand, the solvent 70 in the solvent container 40 can each be heated to a specified temperature. For this purpose, for example, heating jackets or jacket heaters (not shown in FIG. 8) can be arranged on the respective container 20, 40. Other heating devices are possible.

Corresponding temperature sensors TS, which are coupled to a control/regulating device 60, can be provided to control the temperatures in the interior and of the solvent. The control/regulating device 60 can control the supply of thermal energy for heating the interior 21 or for heating the solvent 70 as a function of the measured temperature values.

Furthermore, the pressure-tight container 20 can have a pressure sensor DS with which the pressure conditions in the interior 21 can be monitored. This pressure sensor DS is also coupled to the control/regulating device 60.

The control/regulating device 60 can also control a vacuum pump 30 with which a negative pressure or a vacuum can be generated in the interior 21 of the pressure-tight container 20.

In addition, the control/regulating device 60 is coupled to the valve 50, so that the control/regulating device 60 can control the valve 50 as a function of the temperature in the interior 21.

In a special embodiment of the device according to the invention, it can have one or more further solvent containers 40', which are each connected to the pressure-tight container 20 via a supply line 25' and which can also be designed to be pressure-tight. The supply lines 25' can each have a valve 50' with which the supply of solvent from the respective solvent container 40' into the interior 21 of the container 20 can be controlled.

Furthermore, the solvent containers 40, 40' can each have a pressure sensor DS (not shown in FIG. 8), with which the pressure conditions in each interior 70, 70' can be monitored. These pressure sensors DS are also coupled to the control/regulating device 60.

A different solvent can be stored in each of the solvent containers 40, 40', which is particularly advantageous if a different solvent is to be used for one cycle than for the other cycles.

However, the same solvent can also be stored in the solvent containers 40, 40'. This is advantageous, for example, when this solvent is to be supplied to the interior 21 in two different cycles at a different temperature. The solvent in the solvent container 40 can thus be heated to a different temperature than the solvent stored in the solvent container 40'.

It is particularly advantageous if the pressure-tight container 21 is coupled to a suction device 90, which in turn is coupled to the solvent container 40 via a return line 27. The suction device 90 is adapted to suction off the solvent vapor present in the interior 21 and/or the solvent condensate present on the inner walls of the interior and feed it back to the solvent container 40 via the return line 27. The solvent can thus be optimally used, which on the one hand lowers the costs for the smoothing according to the invention and on the other hand protects the environment.

The suctioned off solvent vapor or the suctioned off solvent condensate can be processed before being supplied to the solvent container 40, in particular cleaned and/or distilled. For this purpose, a cleaning and/or distilling device 80 can be provided in the return line 27. The distillation of the suctioned off solvent vapor or the suctioned off solvent condensate has proven to be particularly advantageous, so that it is particularly advantageous according to the invention to use distillable solvent.

Corresponding return lines with corresponding cleaning and/or distilling devices, which are not shown in FIG. 8, can likewise be provided for the further solvent containers 40'.

The method according to the invention and the device according to the invention for carrying out the method have the advantage that the surfaces of the molded parts can be smoothed in a particularly time-efficient manner, so that the method is also suitable for surface smoothing on an industrial scale. The vaporization in the respective cycle only takes a few seconds since this period is sufficient to allow sufficient solvent vapor to flow into the interior of the pressure-tight container with which the desired smoothing effect is achieved in one cycle. The vacuum-drying also takes only a few seconds, in particular if the solvent vapor still present in the interior and the solvent condensate formed on the interior walls and on the bottom of the interior are suctioned off. This means that a cycle can be carried out within a few seconds.

In addition, the method according to the invention is also particularly suitable for flexible molded parts whose surfaces cannot be mechanically smoothed or only with considerable effort.

Experiments have shown that smooth surfaces can be produced with the method according to the invention, which practically do not differ from surfaces of molded parts which have been produced by injection molding.

A substantial advantage of the invention, however, is that the smoothing according to the invention results in the molded parts having a highly homogeneous surface, which is particularly advantageous when the molded parts are then colored. The homogeneous surface of the molded parts achieved by the method according to the invention means that colors are absorbed equally well over the entire surface, so that a homogeneous color image results. In particular, staining is effectively prevented.

REFERENCE SIGNS

10 Molded part
11 Surface of the molded part 10

20 Pressure-tight container
21 Interior of the pressure-tight container 20
25, 25' Supply line
27 Return line
30 Vacuum pump
40, 40' Solvent container, preferably pressure-tight
50, 50' Valve
60 Control/regulating device
70, 70' Solvent or interior of the solvent container 40, 40'
80 Cleaning/distilling device
90 Suction device
DS Pressure sensor
S1-S6 Steps of the method
TS Temperature sensor

What is claimed is:

1. A method for treating the surface of at least one molded part (10) produced in a 3D printing method, wherein:
   (a) the molded part (10) is introduced into an interior (21) of a pressure-tight container (20),
   (b) a negative pressure is generated in the interior (21) of the container after introducing the molded part (10) into the container (20),
   (c) a solvent is heated up to a specified solvent temperature in a solvent container, and
   (d) the heated solvent is introduced from the solvent container (40) into the interior (21) under negative pressure after introducing the molded part (10) into the interior (21) of the container (20),
      wherein the solvent container (40) is designed to be pressure-tight and wherein a negative pressure is produced in the interior of the solvent container (40) before introducing the solvent from the solvent container (40) into the interior (21) of the pressure-tight container (20);
      wherein the temperature of the molded part (10) is lower than the solvent temperature, and
      wherein the solvent is evaporated into the interior (21) or is introduced as a vapor into the interior (21) upon being introduced, said solvent vapor condensing on the surface of the molded part (10).

2. The method of claim 1, wherein a vacuum is generated in the interior (21) of the container after introducing the molded part (10) into the container (20).

3. The method of claim 1, wherein a negative pressure is generated in the interior (21) of the container after introducing the molded part (10) into the container (20), which negative pressure is less than 10 mbar.

4. The method of claim 1, wherein the interior (21) of the pressure-tight container (20) is brought to a specified first internal temperature before step (a) or after step (a).

5. The method of claim 1, wherein by introducing the solvent into the interior space (21) (step (d)), the temperature of the interior space is brought to a specified second internal temperature, wherein as long as the solvent is introduced into the interior space until a specified second internal temperature is reached, or the solvent is introduced into the interior over a specified period of time, the specified second internal temperature being reached after the specified period of time.

6. The method of claim 1, wherein the solvent is introduced into the interior space (21) over a period of between 1 s and 600 s.

7. The method of claim 5, wherein the temperature of the interior is brought to a third internal temperature after introducing the molded part (10) into the interior (21) (step (a)) and before introducing the solvent into the interior (21) (step (d)).

8. The method of claim 7, wherein the third internal temperature is lower than the specified second internal temperature, whereby the molded part is brought to a part temperature which is lower than the specified second internal temperature.

9. The method of claim 1, wherein
   (e) after introducing the solvent into the interior, the molded part is dried.

10. The method of claim 9, wherein the molded part is dried in the interior space (21) having the negative pressure.

11. The method of claim 9, wherein the molded part is dried in the interior (21), wherein a negative pressure is generated to dry the molded part in the interior (21), wherein the generation of the negative pressure is interrupted at least once in that a transport gas is supplied into the interior (21).

12. The method of claim 11, wherein the transport gas is supplied to the interior (21) when the pressure in the interior (21) is less than 50 mbar, the pressure in the interior (21) being increased to a value of between 50 mbar and 100 mbar by supplying the transport gas.

13. The method of claim 9, wherein steps (d) and (e) are repeated multiple times.

14. The method of claim 13, wherein, during a repetition,
   in step (d) the temperature of the interior is brought to a second internal temperature which is higher than the second internal temperature in the previous execution of step (d), or
   in step (d) the temperature of the interior is brought to a second internal temperature which is lower than the second internal temperature in the previous execution of step (d), or
   in step (d) the temperature of the interior is brought to a second internal temperature which is equal to the second internal temperature in the previous execution of step (d).

15. The method of claim 14, wherein during a repetition prior to carrying out step (d), the temperature of the interior is brought to a temperature which is lower or higher than the second internal temperature in the previous execution of step (d).

16. The method of claim 1, wherein
   the molded part is colored before step (a) or after step (d), and/or
   the molded part is freed from residual powder before step (a), provided that the molded part was printed in a powder-based method, and/or
   the molded part is matted after step (d), and/or is ground, and/or
   the molded part is impregnated and/or painted after step (d), and/or
   the surface of the molded part is compacted before step (a) or after step (d), and/or
   the surface of the molded part is smoothed before step (a) or after step (d).

17. The method of claim 1, wherein the molded part is heated before step (a).

18. The method of claim 1, wherein the solvent is selected from the group consisting of acetaldehyde, acetamide, acetone, acetonitrile, acetophenone, acetylene, aliphatic hydrocarbons, cyclohexene, diisobutylene, hexane, octane, n-pentane and terpinene, alcohols, butylene glycol, butanol, ethanol, ethylene glycol, methanol, ethanol, ethylene glycol, methanol, allyl alcohol, n-propanol and isopropanol, amyl acetate, aniline, anisole, benzine, benzaldehyde, benzene, chlorobenzene, decalin, dioxane, dimethylamide, diemethylformaid, diethyl ether, dimethylformamide, dimethyl sulfide, dimethyl sulfoxide, ethylbenzene, ethyl acetate, formaldehyde, formamide, furfural, halogenated hydrocarbons, chloroform, ethylene chloride, methylene chloride, perchlorethylene, tetrachloromethane, trichloroethane and trichlorethylene, menthone, methyl tert-butyl ether, methylethylene ketone, nitrobenzene, phenols, phenylethyl alcohol, propanol, pyridine, styrene, tetrahydrofuran, tetrahydronaphthalene, tetrahydronaphthalene, and combinations thereof.

19. The method of claim 1, wherein the solvent is a distillable solvent.

20. The method of claim 1, wherein the material of the molded part is selected from the group consisting of polyester, PA12 (polyamide 12), PP (polypropylene), TPU (thermoplastic polyurethane), TPE (thermoplastic elastomers), PA11 (polyamide 11), PA6 (polyamide 6), PA6.6 (polyamide 6.6), glass-filled polyamide, ceramic-filled polyamide, PU (polyurethane), ABS (acrylonitrile-butadiene-styrene copolymers), PEK (polyether ketone), PEI (polyetherimide), PPS (polyphenylene sulfide) PLA (polylactide), cyanate ester, materials based on (meth)acrylates, and combinations thereof.

21. The method of claim 1, wherein the solvent is heated to the specified solvent temperature, which is above 100° C.

22. The method of claim 1, wherein the pressure difference between the interior (21) of the pressure-tight container (20) and the interior of the solvent container (40) is selected so that the solvent introduced into the interior (21) of the pressure-tight container (20) is swirled due to the pressure difference.

23. The method of claim 1, wherein a swirling unit which is arranged in the interior of the pressure-tight container swirls the introduced solvent vapor.

24. The method of claim 23, wherein the swirling unit is a fan.

* * * * *